United States Patent
Nimura et al.

(10) Patent No.: US 7,874,397 B2
(45) Date of Patent: Jan. 25, 2011

(54) BREATHER STRUCTURE OF SHAFT-DRIVE-TYPE DRIVE DEVICE

(75) Inventors: Taisuke Nimura, Saitama (JP); Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 12/054,802

(22) Filed: Mar. 25, 2008

(65) Prior Publication Data

US 2008/0236331 A1 Oct. 2, 2008

(30) Foreign Application Priority Data

Mar. 29, 2007 (JP) ............................. 2007-086636

(51) Int. Cl.
  *B60K 11/08* (2006.01)
  *F16H 57/02* (2006.01)
(52) U.S. Cl. .................. 180/339; 464/17; 74/606 A
(58) Field of Classification Search .............. 180/339, 180/378; 464/17; 74/606 R, 608, 606 A, 74/607
See application file for complete search history.

(56) References Cited

U.S. PATENT DOCUMENTS

| | | | | |
|---|---|---|---|---|
| 7,055,509 B2 * | 6/2006 | Hara | ........................ | 123/572 |
| 7,562,597 B2 * | 7/2009 | Mashita | ........................ | 74/331 |
| 2003/0218885 A1 * | 11/2003 | Ishizaki | ........................ | 362/547 |
| 2007/0062319 A1 * | 3/2007 | Mashita | ........................ | 74/329 |
| 2007/0295158 A1 * | 12/2007 | Adleman et al. | .......... | 74/606 R |
| 2009/0229908 A1 * | 9/2009 | Ito | ............................. | 180/312 |
| 2009/0247309 A1 * | 10/2009 | Ito | ............................. | 464/160 |
| 2010/0126306 A1 * | 5/2010 | Ito et al. | ....................... | 74/607 |

FOREIGN PATENT DOCUMENTS

| | | | |
|---|---|---|---|
| JP | 58-116887 U | | 8/1983 |
| JP | 59226780 A | * | 12/1984 |
| JP | 62-26959 B2 | | 6/1987 |

* cited by examiner

*Primary Examiner*—Paul N Dickson
*Assistant Examiner*—Drew Brown
(74) *Attorney, Agent, or Firm*—Birch, Stewart, Kolasch & Birch, LLP (57) ABSTRACT

To provide the breather structure of a shaft-drive-type drive device which can miniaturize a gear casing as a whole and can exhibit an excellent appearance. A shaft-drive-type drive device is capable of transmitting an output of an engine mounted on a vehicle body to a wheel by way of a drive shaft by connecting one end of the drive shaft to an output shaft of the engine by way of a universal joint and by connecting the wheel to another end side of the drive shaft by way of gears or the like. A breather mechanism, which performs a breathing operation of the inside of a gear casing housing the gears or the like, is mounted on the gear casing, and an atmosphere opening portion of the breather mechanism is formed to open upwardly in the vertical direction of a vehicle and inwardly in the width direction of the vehicle.

16 Claims, 7 Drawing Sheets

BREATHER STRUCTURE OF SHAFT-DRIVE-TYPE DRIVE DEVICE

CROSS-REFERENCE TO RELATED APPLICATIONS

The present application claims priority under 35 USC 119 to Japanese Patent Application No. 2007-086636 filed on Mar. 29, 2007 the entire contents of which are hereby incorporated by reference.

BACKGROUND OF THE INVENTION

1. Field of Invention

The present invention relates to the breather structure of a shaft-drive-type drive device in a shaft-drive-type power transmission mechanism for a motorcycle or the like.

2. Description of Background Art

In general, a shaft-drive-type power transmission mechanism for a motorcycle or the like is configured such that a drive bevel gear is integrally formed on a rear end of a drive shaft interlocked with an engine, and the drive bevel gear is meshed with a driven bevel gear which is pivotally supported on a rear fork and is interlocked with a rear wheel so as to transmit the rotation of the engine to the rear wheel. The drive and driven bevel gears are housed in a hermetically sealed gear chamber formed in a final casing which is mounted on one side of the rear fork. The drive and driven bevel gears are lubricated by lubricating oil sealed in the gear chamber. Further, for reducing air resistance when the drive and driven bevel gears are rotated, particularly, when the drive and driven bevel gears are rotated at a high speed, a breather mechanism for performing breathing of the gear chamber is mounted on the final casing. See, for example, JP-UM-A-58-116887 and JP-B-62-26959.

However, the conventional construction has a drawback wherein the breather mechanism for breathing is mounted on an upper portion of a gear box in a projecting manner. Thus, parts for forming the breather mechanism become necessary. Further, a portion of the breather mechanism projects from the box. Thus, there arises a drawback wherein the design property is lowered and the casing becomes large-sized as a whole.

SUMMARY AND OBJECTS OF THE INVENTION

Accordingly, it is an object of an embodiment of the present invention to provide the breather structure of a shaft-drive-type drive device which can overcome the above-mentioned drawbacks of the prior art, can miniaturize a gear casing as a whole, and can exhibit an excellent appearance.

According to an embodiment of the present invention, in the breather structure of a shaft-drive-type drive device capable of transmitting an output of an engine mounted on a vehicle body to a wheel by way of a drive shaft by connecting one end of the drive shaft to an output shaft of the engine by way of a universal joint and by connecting a wheel to another end of the drive shaft by way of gears or the like, the breather structure includes a breather mechanism which performs a breathing operation between the inside of a gear casing which houses the gears or the like therein and an atmosphere side. In addition, an atmosphere opening portion of the breather mechanism is formed to open upwardly in the vertical direction of a vehicle and inwardly in the lateral direction of the vehicle.

According to an embodiment of the present invention, the breather mechanism does not project upwardly in the vertical direction of the vehicle. Thus, the gear casing can be formed in a compact shape as a whole and, at the same time, the breather mechanism is concealed inwardly in the lateral direction of the vehicle as viewed in a side view of a vehicle body. Thus, it is possible to enhance the appearance of the breather structure.

A water-proof moisture-permeable material may be arranged in an atmosphere opening portion of the breather mechanism.

The water-proof moisture-permeable material may be any material provided that the material allows air to flow into and to flow out from the gear casing but prevents water or moisture from intruding into the gear casing.

Further, the atmosphere opening portion of the above-mentioned breather mechanism may be formed to open in a space formed between the gear casing and a disc brake. The above-mentioned breather mechanism may be arranged on a front portion of the gear casing in the longitudinal direction of the vehicle.

By allowing the atmosphere opening portion to open in the space sandwiched between the gear casing and the disc brake, the disturbances (rain water or the like) do not directly impinge on the atmosphere opening portion. Thus, it is possible to prevent the intrusion of water.

Further, the breather mechanism may be configured such that the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the gear casing. Further, the end portion of the inclined hole may be in communication with a space formed between a bearing arranged in the inside of the gear casing and a sealing member. The space may be in communication with the gear case through a space formed between an outer race and an inner race of the bearing.

The breather mechanism includes the ventilation hole and the inclined hole which are formed in the gear casing, and the end portion of the inclined hole penetrates the side wall of the gear casing and opens in the gear casing. Thus, it is possible to realize the breather mechanism with the extremely simple construction. Further, by allowing the end portion of the inclined hole to be in communication with the space formed between the bearing and the sealing member inside the gear casing, and by allowing the space to be in communication with the gear chamber through the space formed between the outer race of the bearing and the inner race of the bearing, it is possible to efficiently release air in the gear chamber to the atmosphere.

According to an embodiment of the present invention, the breather mechanism does not project upwardly in the vertical direction of the vehicle different from the conventional breather mechanism. Thus, the whole gear casing can be formed in a compact shape and, at the same time, the breather mechanism can be concealed inwardly in the lateral direction of the vehicle as viewed in a side view of a vehicle body. Thus, it is possible to enhance the appearance of the breather structure.

Further, by arranging the water-proof moisture-permeable material in the atmosphere opening portion of the breather mechanism, air can flow into and flow out from the gear casing but water or moisture can not intrude into the inside of the gear casing.

By opening the atmosphere opening portion of the breather mechanism in the space sandwiched between the gear casing and the disc brake, the disturbances (rain water or the like) do not directly impinge on the atmosphere opening portion. Thus, it is possible to prevent the intrusion of water into the gear casing.

Further, by constructing the breather mechanism using the ventilation hole and the inclined hole formed in the gear casing, and by allowing the end portion of the inclined hole to penetrate the side wall of the gear casing and to open in the gear casing, it is possible to realize the breather mechanism with an extremely simple construction.

By allowing the end portion of the inclined hole to be in communication with the space defined between the bearing and the scaling member in the inside of the gear casing, and by allowing the space to be in communication with the gear chamber through the space defined between the outer race and inner race of the bearing it is possible to efficiently release air in the gear chamber to the atmosphere.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention is explained in conjunction with attached drawings.

Figure 1:
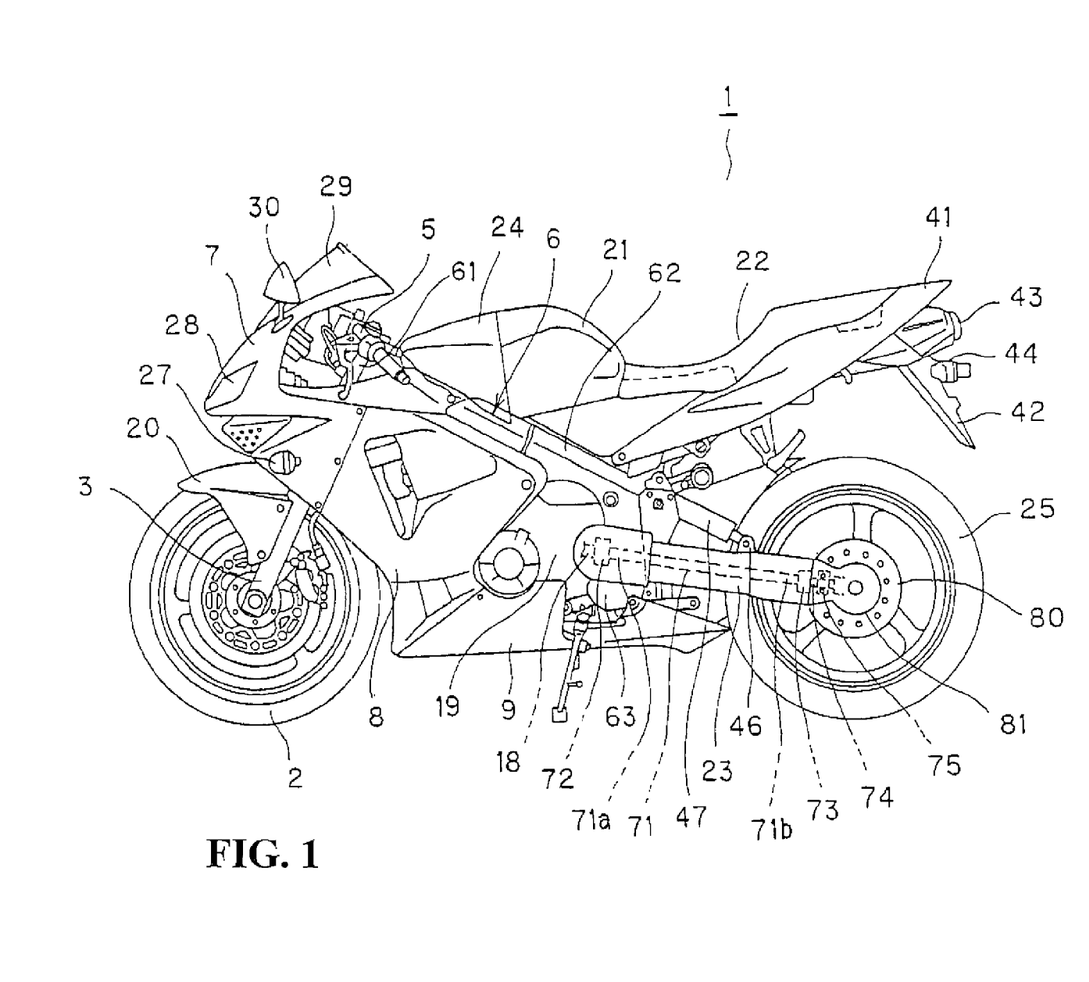
FIG. 1 is a side view of a motorcycle having the breather structure of a shaft-drive-type drive device according to one embodiment of the present invention.

FIG. 1 is a schematic view of a motorcycle which includes the breather structure of a shaft-drive-type drive device according to one embodiment of the present invention. Here, the vertical direction and the longitudinal direction in the explanation made hereinafter indicate directions by reference to the motorcycle shown in FIG. 1, and the lateral direction indicate a direction as viewed from a rider.

As shown in FIG. 1, a motorcycle 1 includes a vehicle body frame 6. The vehicle body frame 6 includes a head pipe 61, a pair of left and right main frames 62 which extends obliquely in the rearward and downward direction from the head pipe 61, a pair of left and right pivot plates 63 which is connected to rear portions of the main frames 62, and a cross member not shown in drawing which connects the pivot plates 63 to each other horizontally.

A front fork 3 is, as shown in FIG. 1, connected to the head pipe 61 of the vehicle body frame 6 in a rockable manner, a front wheel 2 which includes a hydraulic disc brake is rotatably supported on a lower end portion of the front fork 3, and a front fender 20 is arranged above the front wheel 2. The front fender 20 is mounted in a state wherein the front fender 20 is supported on the front fork 3. Further, a steering wheel 5 is mounted on an upper end portion of the front fork 3. A water-cooled in-line transverse-mounted 4-cylinder engine 19 is mounted on a lower side of a center portion of the vehicle body frame 6. Middle cowlings 8 are arranged on both left and right sides of the engine 19. The middle cowlings 8 are detachably mounted on a vehicle body in a state that the middle cowlings 8 are contiguously formed with an upper cowling 7. Further, a two-bulb head light 28, a wind screen 29, a pair of left and right front blinkers 27 and a pair of left and right rearview mirrors 30 are mounted on the upper cowling 7.

A lower cowling 9 is mounted on a lower portion of the engine 19, and the lower cowling 9 is detachably mounted on the vehicle body in a state wherein the lower cowling 9 is contiguously formed with the middle cowlings 8. Further, a fuel tank 21 is arranged above the engine 19 and is mounted on an upper portion of the vehicle body frame 6, and a rider's seat 22 is mounted on a rear portion of the fuel tank 21. A half cover 24 is mounted on a front side of the fuel tank 21, and the half cover 24 covers a space in front of the fuel tank 21 from above. A rear cowling 41 and a rear fender 42 are mounted below a rear portion of the rider's seat 22. A stop lamp 43 and a pair of left and right rear blinkers 44 are mounted on the rear fender 42.

In a rear lower portion of the vehicle body frame 6, as shown in FIG. 1, a rear fork 23 is supported on the pivot plate 63 by way of a pivot shaft (not shown in the drawing) in a rockable manner, and a shaft-drive-type rear wheel 25 which includes a hydraulic disc brake 80 is rotatably supported on a rear end portion of the rear fork 23 below the rear fender 42. Further, a bracket 46 is mounted on a center upper portion of the rear fork 23, a lower end of a rear shock absorber 47 is connected to the bracket 46, and an upper end of the rear shock absorber 47 is connected to a bracket (not shown in the drawings) which is mounted on the main frame 62. The rear fork 23 also functions as a shaft casing which covers a drive shaft 71 with one end 71a of the drive shaft 71 being connected to an output shaft 18 of the engine 19 by way of a universal joint (universal coupling) 72 and another end 71b of the drive shaft 71 is connected to a drive-shaft distal end shaft 74 by way of a fastening joint 73. The drive-shaft distal end shaft 74 is rotatably supported in the inside of a final casing (gear casing) 81 arranged on a rear portion of the rear fork 23 by way of a bearing 75.

Figure 2:
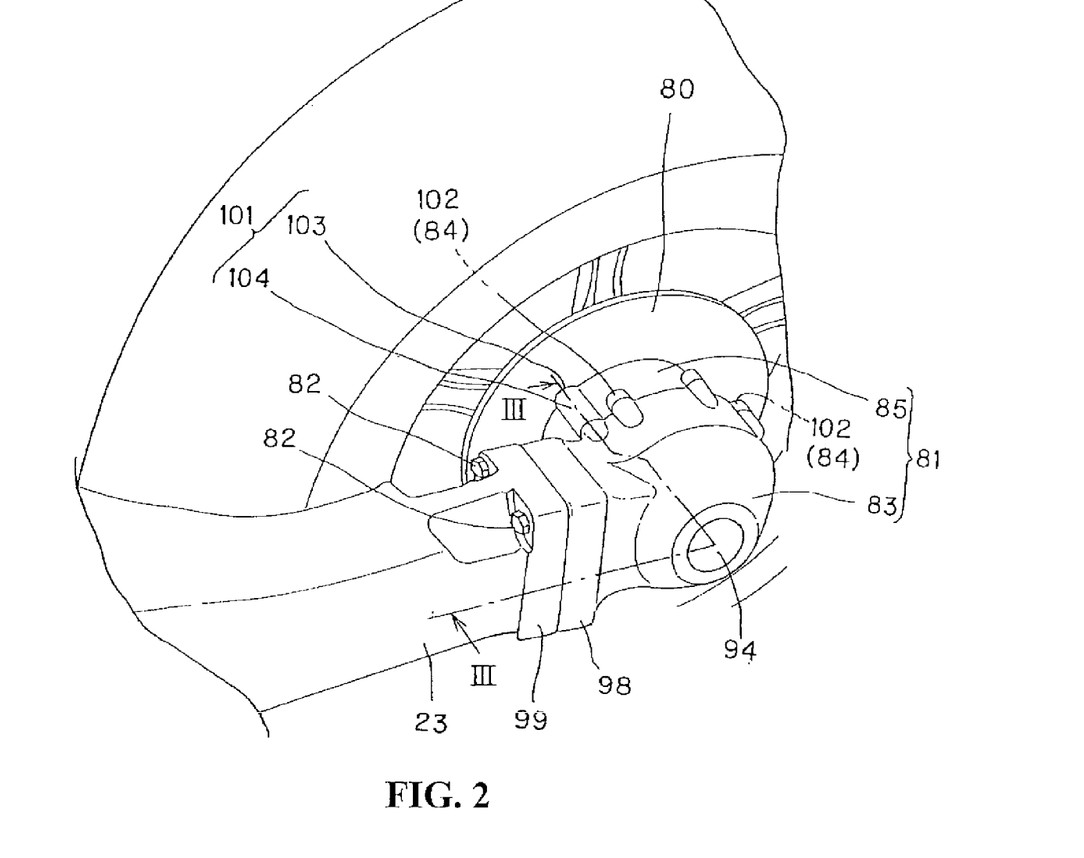
FIG. 2 is a perspective view showing a final casing.
Figure 3:
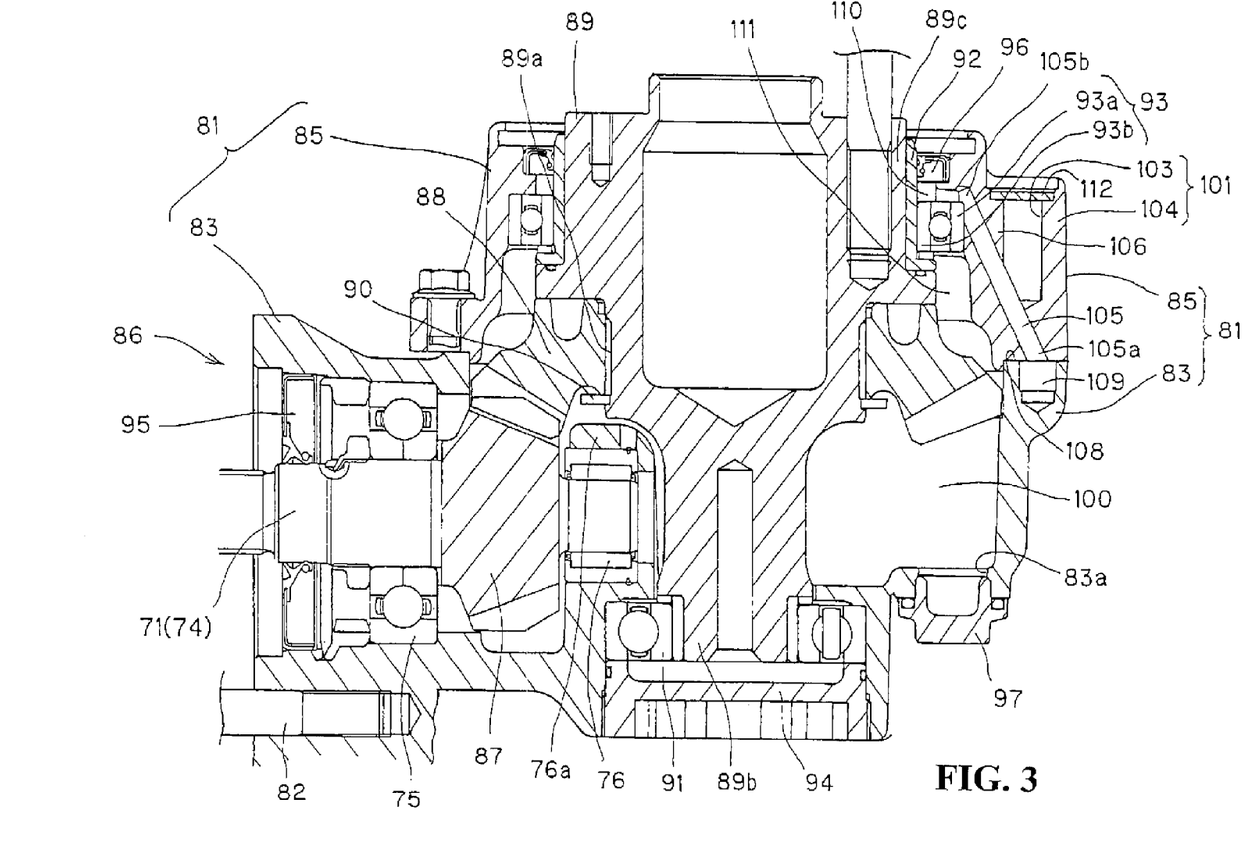
FIG. 3 is a cross-sectional developed view taken along a line III-III in FIG. 2.

FIG. 2 is a perspective view showing the final casing 81. The final casing 81 includes a rear-fork-side casing portion 83 which is fastened to a rear end of the rear fork 23 using a plurality of bolts 82 and a wheel-side casing portion 85 which is fastened to the rear-fork-side casing portion 83 using a plurality of hexagon socket head bolts 84 (see FIG. 4). A flange 98 is integrally formed on the rear-fork-side casing portion 83. The flange 98 is Drought into contact with a mating flange 99 which is integrally formed on a rear end of the rear fork 23, and the respective flanges 98, 99 are fastened to each other using the plurality of bolts 82. Further, in the inside of the respective casing portions 83, 85, as shown in FIG. 3, a power transmission mechanism 86 is housed which transmits power of the engine 19 transmitted by means of the drive shaft 71 to the rear wheel 25. In the power transmission mechanism 86, a drive bevel gear 87 is integrally formed on a rear portion of the drive-shaft distal end shaft 74 shown on a left end in the drawing, and the drive-shaft distal end shaft 74 is rotatably supported on a bearing 75 and a bearing 76 which are positioned at both sides of the drive bevel gear 87 in the inside of the rear-fork-side casing portion 83. The above-mentioned bearing 76 which is arranged on a deep side of the drive bevel gear 87 is supported on a bearing supporting portion 76a (see FIG. 5) which is mounted in the inside of the rear-fork-side casing portion 83 in a projecting manner.

The above-mentioned drive bevel gear 87 is meshed with a driven bevel gear 88. The driven bevel gear 88 is engaged with a spline shaft 89a formed on a center portion of a power transmission shaft 89 by spline fitting, and is held in place by a retainer ring 90. The above-mentioned power transmission shaft 89 has one end portion 89b thereof rotatably supported on a bearing 91 arranged in the rear-fork-side casing portion 83. A collar 92 is fitted on another end portion 89c of the power transmission shaft 89 and is rotatably supported on a bearing 93 which is arranged in the wheel-side casing portion 85. Further, a rear-wheel shaft (not shown in the drawings) of the rear wheel 25 is fastened to another end portion 89c of the power transmission shaft 89 in a state wherein the rear wheel shaft is integrally rotatable with the power transmission shaft 89. The bearing 91 which supports one end portion 89b of the power transmission shaft 89 is held by a lid body 94.

Due to such a construction, power of the engine 19 which is transmitted by way of the above-mentioned drive shaft 71 is transmitted to the power transmission shaft 89 from the drive-shaft distal end shaft 74 by way of the drive bevel gear 87 and the driven bevel gear 88. The power is further transmitted to the rear-wheel shaft of the rear wheel 25 which is connected to the power transmission shaft 89 thus driving the rear wheel 25.

A gear chamber 100 which is formed in the inside of the final casing 81 and houses the drive and driven bevel gears 87, 88 therein is hermetically sealed. More specifically, a sealing member 95 is arranged in a through hole which is formed in the rear-fork-side casing portion 83 and through which the drive-shaft distal end shaft 74 penetrates. A sealing member 96 is arranged in a through hole which is formed in the wheel-side casing 85 through which the power transmission shaft 89 penetrates. Further, an oil filling port 83a is formed in a right lower portion of the rear-fork-side casing 83 in the drawing with a plug 97 being arranged in the oil filling port 83a. A proper quantity of lubricating oil is filled into the gear chamber 100 formed in the final casing 81 from the oil filling port 83a by removing the plug 97.

Figure 4:
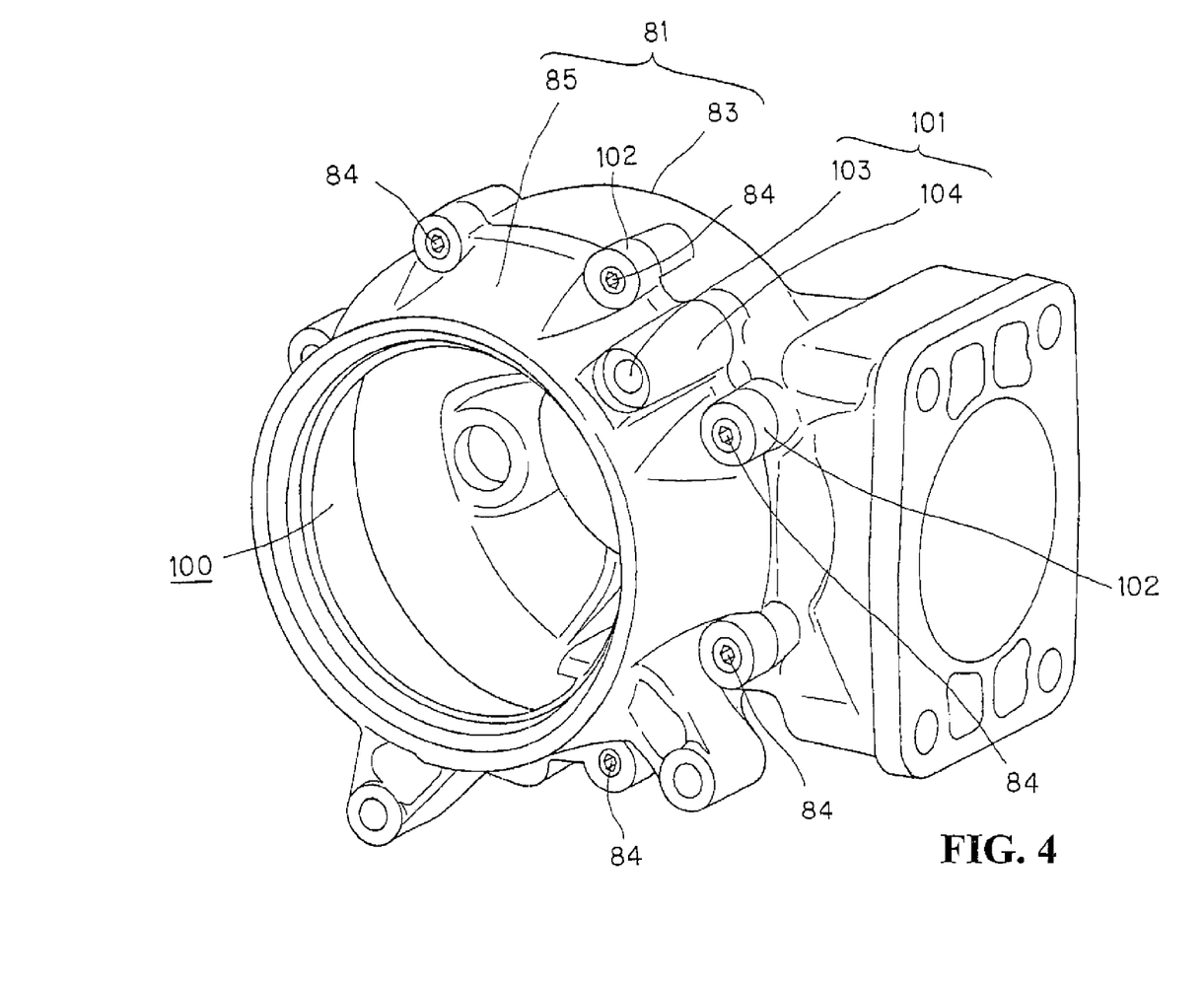
FIG. 4 is a perspective view showing a state wherein a rear-fork-side casing portion and a wheel-side casing portion are fastened to each other in the final casing.
Figure 5:
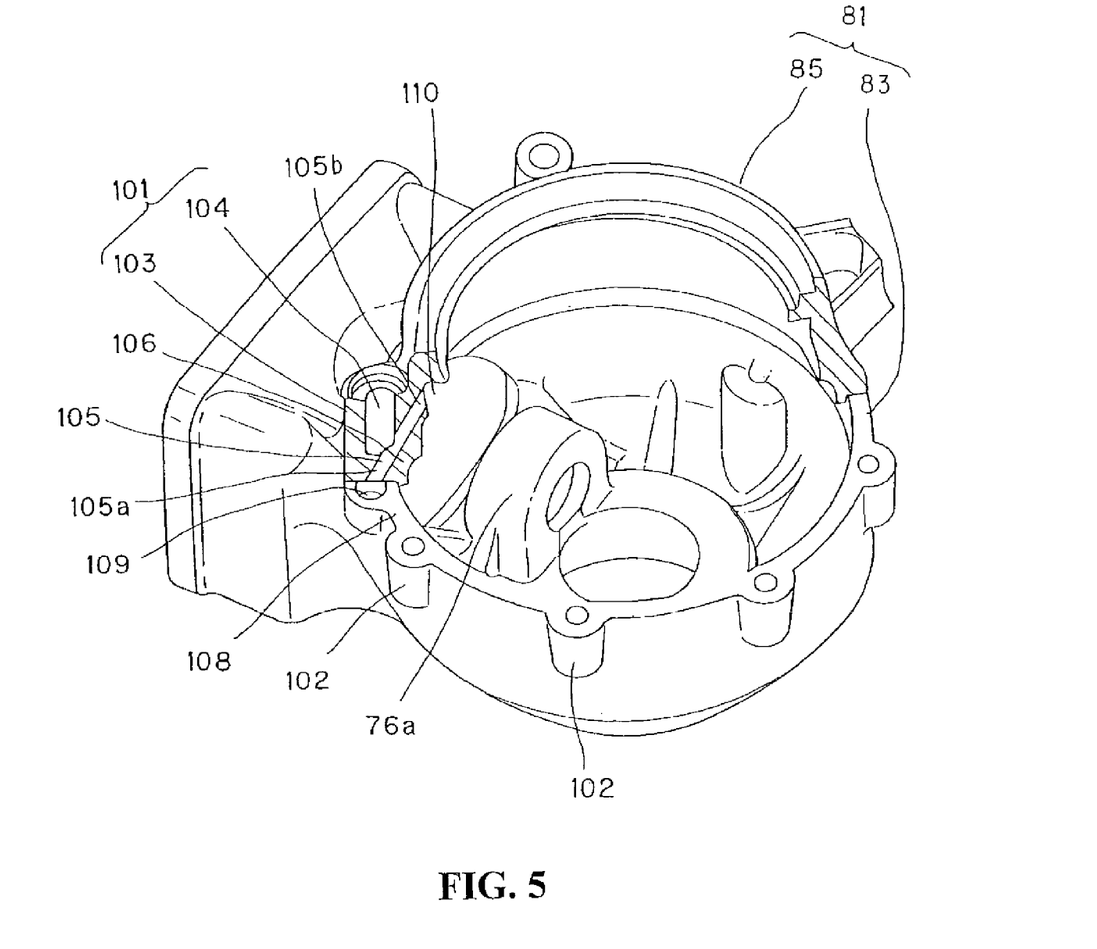
FIG. 5 is a perspective view of the final casing with a part broken away.

Next, a breather mechanism for breathing according to this embodiment is explained. FIG. 4 is a perspective view showing a state wherein the rear-fork-side casing portion 83 and the wheel-side casing portion 85 are fastened to each other in the final casing 81. FIG. 5 is a perspective view of the final casing 81 with a part broken away. The final casing 81 includes, as shown in FIG. 4, the breather mechanism 101 for breathing which is arranged between boss portions 102, 102 through which the fastening bolts 84 penetrate. The breather mechanism 101 for breathing is provided for reducing air resistance when the drive and driven bevel gears 87, 88 (not shown in FIG. 4) which are mounted in the gear chamber 100 are rotated, particularly at a high speed, and leads air in the inside of the gear chamber 100 toward the outside of the final casing 81. The breather mechanism 101 for breathing includes a breather boss portion 104 which is mounted on an outer circumference of a front end portion of the wheel-side casing portion 85 in the longitudinal direction of a vehicle, is positioned between the boss portions 102 through which the fastening bolts 84 penetrate, and extends in a cylindrical shape while having the substantially same diameter as the boss portion 102 and a ventilation hole (atmosphere opening portion) 103 which is formed in the breather boss portion 104 and is in communication with the atmosphere. The breather boss portion 104 hardly projects to the outside in the outer radial direction of the wheel-side casing portion 85 but extends toward the rear wheel 25, and the ventilation hole 103 opens toward a disc surface of the disc brake 80. The breather boss portion 104 is arranged on an upper side in the vertical direction of the vehicle, and the ventilation hole 103 opens inwardly in the vehicle-width direction of the vehicle.

A deep end of the ventilation hole 103 is, as shown in FIG. 5, blind in a middle portion of the wheel-side casing portion 85 without penetrating the wheel-side casing portion 85 and is in communication with an inclined hole 105 formed in the wheel-side casing portion 85. One end 105a of the inclined hole 105 opens in a blind hole 109 formed in a mating-surface-108 side of the rear-fork-side casing portion 83 at a mating surface 108 between the wheel-side casing portion 85 and the rear-fork-side casing portion 83. Another end 105b of the inclined hole 105 penetrates a side wall 106 of the wheel-side casing portion 85 and opens in the inside of the wheel-side casing 85. Another end 105b of the inclined hole 105 is, as shown in FIG. 3, in communication with a space 110 formed between the above-mentioned bearing 93 and the sealing member 96. The space 110 is in communication with a space 111 through a space formed between an outer race 93a of the bearing 93 and an inner race 93b of the bearing 93, and the space 111 is in communication with the above-mentioned gear chamber 100.

A water-proof moisture-permeable material 112 is arranged in an inlet portion of the ventilation hole 103. The water-proof moisture-permeable material 112 may be any material which allows air to flow into or to flow out from the inside of the wheel-side casing portion 85 but prevents water, moisture or the like from entering the inside of the wheel-side casing portion 85. The removal of the material 112 is prevented by a filter pusher. The arrangement position of the material 112 is not limited to the inlet of the ventilation hole 103 and the material 112 may be arranged at an arbitrary position.

Figure 6:
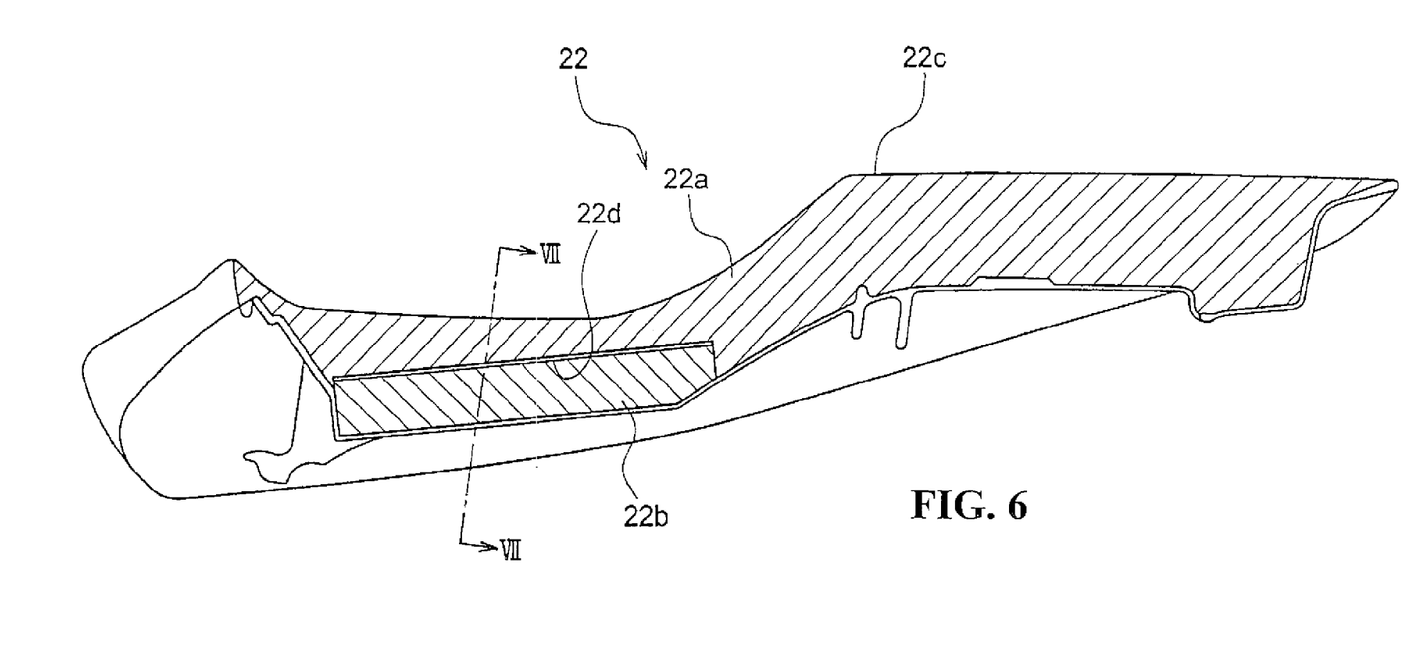
FIG. 6 is a longitudinal cross-sectional view of a rider's seat.
Figure 7:
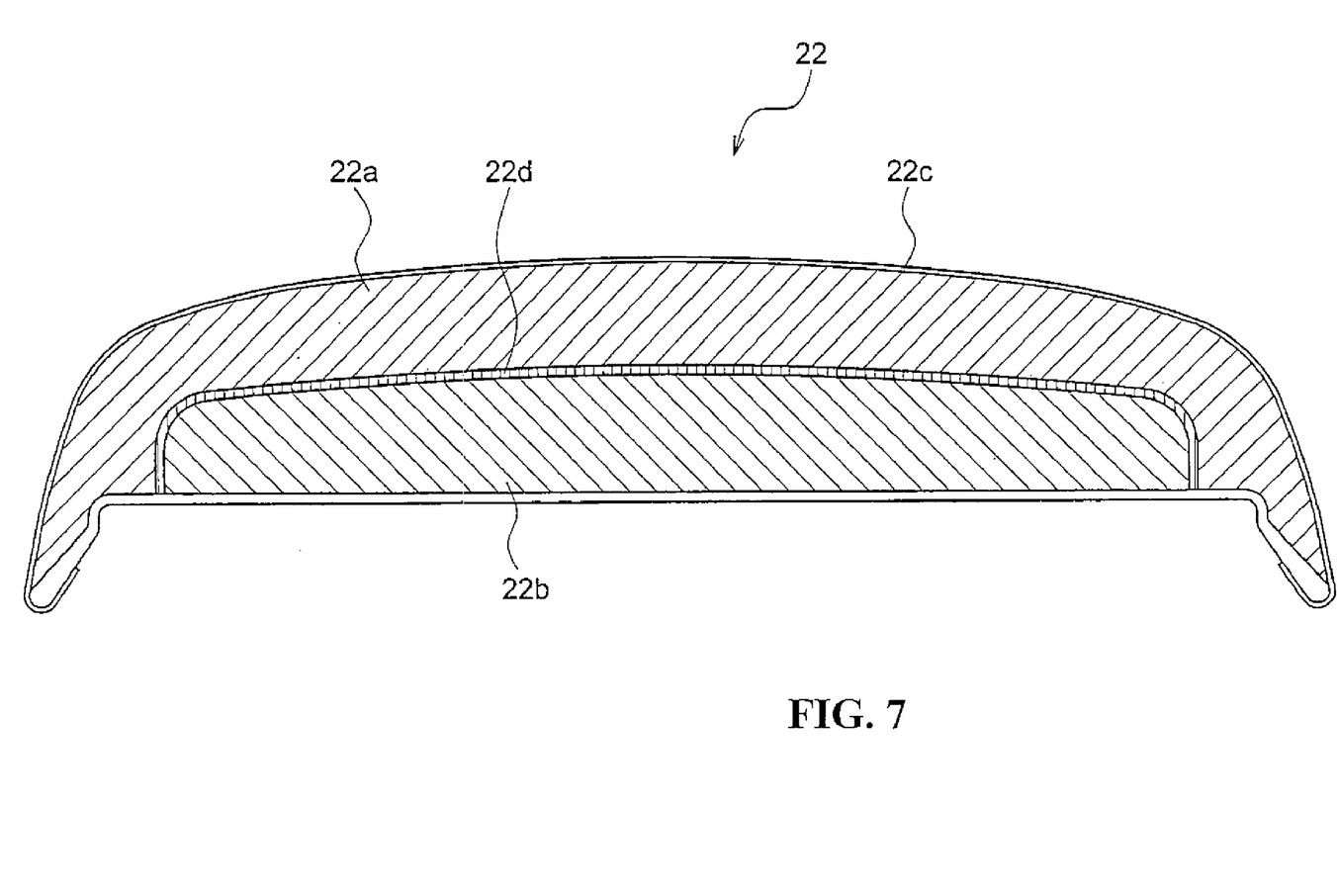
FIG. 7 is a cross-sectional view taken along a line VII-VII in FIG. 6.

FIG. 6 is a cross-sectional view of the rider's seat 22. FIG. 7 is a cross-sectional view taken along a line VII-VII in FIG. 6. The rider's seat 22 adopts, at a seating portion for a rider, the two-layered structure consisting of cushion members 22a, 22b. The upper-side cushion member 22a is formed of a single material made of foamed urethane and extends to an upper portion of the rear cowling 41 inside a skin 22c. Further, the lower-side cushion member 22b is formed of a low-repulsive mesh cushion, and is covered with a boundary layer 22d having rigidity. A plastic elastomer is used as a material of the cushion member 22b, for example.

The rider's seat 22 adopts the two-layered structure as described above. Thus, a rider feels little fatigue even when the rider drives the motorcycle for a long time whereby riding comfort is enhanced. Further, the lower-side cushion member 22b is covered with the boundary layer 22d having rigidity and hence, the deformation of the cushion member 22b can be prevented.

In this embodiment, when the rider rides on the motorcycle and drives the engine 19, the drive shaft 71 which is connected to the engine output shaft 18 is rotated. The rotation of the drive shaft 17 is transmitted to the rear wheel 25 by way of the drive bevel gear 87, the driven bevel gear 88 and the power transmission shaft 89.

In the above-mentioned gear chamber 100, a breathing operation occurs due to the pressure fluctuation generated by the rotation of the drive bevel gear 87 and the driven bevel gear 88. In this case, air in the inside of the gear chamber 100 is discharged to the space 110 through the space formed between the outer race 93a and the inner race 93b of the bearing 93 and is released to the atmosphere from the space 110 by way of the inclined hole 105 and the ventilation hole 103 which are formed in the wheel-side casing portion 85. Accordingly, the breathing operation can be performed.

In this embodiment, the breather mechanism 101 does not largely project upwardly in the vertical direction of the vehicle. Thus, the final casing 81 can be formed in a compact shape as a whole. The breather boss portion 104 hardly projects to the outside of the wheel-side casing portion 85 in the outward radial direction. Thus, the breather boss portion 104 is concealed inside in the vehicle-width direction of the vehicle as viewed in a side view of the vehicle body thus enhancing design property of the motorcycle.

The breather boss portion 104 is arranged on an upper side in the vertical direction of the vehicle, and the ventilation hole 103 opens inwardly in the vehicle-width direction of the vehicle. Thus, water such as rain water or moisture hardly intrudes into the breather mechanism 101.

Further, the water-proof moisture-permeable material 112 is arranged in the ventilation hole 103 of the breather mechanism 101. Thus, by using the material 112, while the breather mechanism 101 allows air to flow into or to flow out from the final casing 81, the breather mechanism 101 can prevent water, moisture or the like from intruding into the inside of the final casing 81.

The ventilation hole 103 of the breather mechanism 101 is formed to open in the space sandwiched between the final casing 81 and the disc brake 80. Thus, disturbances such as rain water or the like hardly impinge on the atmosphere opening portion directly whereby it is possible to prevent the intrusion of water into the final casing 81.

The above-mentioned breather mechanism 101 is simply configured such that the ventilation hole 103 is formed in the breather boss portion 104 formed on the wheel-side casing portion 85, the ventilation hole 103 is in communication with the inclined hole 105 formed in the wheel-side casing portion 85, and the inclined hole 105 opens in the wheel-side casing portion 85. Due to such a construction, it is possible to extremely easily realize the breather mechanism 101.

Further, the end portion of the inclined hole 105 is in communication with the space formed between the bearing 93 and the sealing member 96 inside the wheel-side casing portion 85 and, at the same time, the space is in communication with the space 110 through the space formed between the outer race 93a and the inner race 93b of the bearing 93. Due to such a construction, air is released to the atmosphere from the space 110 by way of the inclined hole 105 and the ventilation hole 103 formed in the wheel-side casing portion 85. Thus, it is possible to extremely easily realize the breather mechanism 101.

Although the best mode for carrying out the present invention has been explained heretofore, the present invention is not limited to the above-mentioned embodiment and various modifications and changes are conceivable based on the technical concept of the present invention. For example, the ventilation hole 103 may open on a rear-wheel-25 side. It is not always necessary to form the ventilation hole 103 in the cylindrical breather boss portion 104. Further, the shape, the number and the like of the breather boss portions 104 may be respectively arbitrarily changed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A breather structure for a shaft-drive-type drive device capable of transmitting an output of an engine mounted on a vehicle body to a wheel by way of a drive shaft by connecting one end of the drive shaft to an output shaft of the engine by way of a universal joint and by connecting a wheel to another end side of the drive shaft by way of gears or the like, comprising:
   a breather mechanism for performing a breathing operation between an inside of a gear casing for housing the gears therein and an atmosphere side; and
   an atmosphere opening portion of the breather mechanism formed to open upwardly in a vertical direction of a vehicle and inwardly in a lateral direction of the vehicle,
   wherein the atmosphere opening portion of the breather mechanism is formed to open between the gear casing and a disc brake.

2. The breather structure of a shaft-drive-type drive device according to claim 1, wherein a water-proof moisture-permeable material is arranged in the atmosphere opening portion of the breather mechanism.

3. The breather structure of a shaft-drive-type drive device according to claim 2, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

4. The breather structure of a shaft-drive-type drive device according to claim 3, wherein the end portion of the inclined hole is in communication with a space formed between a bearing arranged inside the gear casing and a sealing member, and the space is in communication with the gear case through a space formed between an outer race and an inner race of the bearing.

5. The breather structure of a shaft-drive-type drive device according to claim 1, wherein the breather mechanism is arranged on a front portion of the gear casing in the longitudinal direction of the vehicle.

6. The breather structure of a shaft-drive-type drive device according to claim 5, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

7. The breather structure of a shaft-drive-type drive device according to claim 1, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

8. The breather structure of a shaft-drive-type drive device according to claim 7, wherein the end portion of the inclined hole is in communication with a space formed between a bearing arranged inside the gear casing and a sealing member, and the space is in communication with the gear case through a space formed between an outer race and an inner race of the bearing.

9. A breather structure for a shaft-drive-type drive device, comprising:

a breather mechanism for communicating an inside of a gear casing to atmosphere; and an atmosphere opening operatively connected to the breather mechanism formed to open upwardly in a vertical direction and inwardly in a lateral direction, wherein the atmosphere opening portion of the breather mechanism is formed to open between the gear casing and a disc brake.

10. The breather structure of a shaft-drive-type drive device according to claim 9, wherein a water-proof moisture-permeable material is arranged in the atmosphere opening portion of the breather mechanism.

11. The breather structure of a shaft-drive-type drive device according to claim 10, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

12. The breather structure of a shaft-drive-type drive device according to claim 11, wherein the end portion of the inclined hole is in communication with a space formed between a bearing arranged inside the gear casing and a sealing member, and the space is in communication with the gear case through a space formed between an outer race and an inner race of the bearing.

13. The breather structure of a shaft-drive-type drive device according to claim 9, wherein the breather mechanism is arranged on a front portion of the gear casing in the longitudinal direction of the vehicle.

14. The breather structure of a shaft-drive-type drive device according to claim 13, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

15. The breather structure of a shaft-drive-type drive device according to claim 9, wherein the breather mechanism includes a breather boss portion formed on the gear casing and a ventilation hole formed in the breather boss portion, the ventilation hole is in communication with an inclined hole formed in the gear casing, and an end portion of the inclined hole penetrates a side wall of the gear casing and opens in the inside of the gear casing.

16. The breather structure of a shaft-drive-type drive device according to claim 15, wherein the end portion of the inclined hole is in communication with a space formed between a bearing arranged inside the gear casing and a sealing member, and the space is in communication with the gear case through a space formed between an outer race and an inner race of the bearing.

* * * * *